United States Patent
Nagamine et al.

(10) Patent No.: US 8,164,430 B2
(45) Date of Patent: Apr. 24, 2012

(54) VEHICLE SURROUNDING RECOGNITION SUPPORT SYSTEM FOR VEHICLE

(75) Inventors: Noboru Nagamine, Anjo (JP); Kazuya Watanabe, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 437 days.

(21) Appl. No.: 12/543,036

(22) Filed: Aug. 18, 2009

(65) Prior Publication Data

US 2010/0073152 A1 Mar. 25, 2010

(30) Foreign Application Priority Data

Sep. 22, 2008 (JP) ................................ 2008-242890

(51) Int. Cl.
*B60Q 1/00* (2006.01)
(52) U.S. Cl. ..................... 340/425.5; 340/435; 340/436; 340/465; 340/903; 180/167
(58) Field of Classification Search .............. 340/425.5, 340/435, 436, 465, 438, 903, 904, 901, 990, 340/995.1, 555; 180/167, 169, 274; 701/45, 701/23, 301
See application file for complete search history.

(56) References Cited

U.S. PATENT DOCUMENTS

| 5,549,325 A | * | 8/1996 | Kiribayashi et al. | .......... 280/735 |
| 5,786,772 A | * | 7/1998 | Schofield et al. | ............. 340/903 |
| 7,057,505 B2 | * | 6/2006 | Iwamoto | ...................... 340/463 |

FOREIGN PATENT DOCUMENTS

| JP | 9-132094 A | 5/1997 |
| JP | 3464368 B2 | 2/1999 |
| JP | 2000-272414 A | 10/2000 |
| JP | 2004-86524 A | 3/2004 |

OTHER PUBLICATIONS

European Search Report dated Jan. 4, 2010 (4 pages).

* cited by examiner

*Primary Examiner* — Anh V La
(74) *Attorney, Agent, or Firm* — Sughrue Mion, PLLC

(57) ABSTRACT

A vehicle surrounding recognition support system for a vehicle includes a contact detection device detecting whether or not a driver of the vehicle touches a turn signal operating lever or moves his/her hand close to the turn signal operating lever, an object position detecting device detecting a position of an object existing around the vehicle, an object information identification device identifying information relating to the object in accordance with a result of detection of the object position detecting device, and a warning device warning the driver about the existence of the object in accordance with the information of the object, identified by the object information identification device, when the contact detection device detects that the driver touches the turn signal operating lever or moves his/her hand close to the turn signal operating lever.

14 Claims, 6 Drawing Sheets

VEHICLE SURROUNDING RECOGNITION SUPPORT SYSTEM FOR VEHICLE

CROSS REFERENCE TO RELATED APPLICATIONS

This application is based on and claims priority under 35 U.S.C. §119 to Japanese Patent Application 2008-242890, filed on Sep. 22, 2008, the entire content of which is incorporated herein by reference.

FIELD OF THE INVENTION

The present invention relates to a vehicle surrounding recognition support system for a vehicle for improving the safety of driving of the vehicle.

BACKGROUND

A known lane-change warning system disclosed in JP1997-132094A (hereinafter referred to as Patent document 1) is configured so as to detect operation of a turn signal, which is conducted when a driver moves a turn signal operating lever for activating a turn signal light. When the operation of the turn signal is detected, an obstacle detection device for detecting an obstacle located in a lateral and rearward area around a vehicle of the driver detects an obstacle existing in a rearward area around the vehicle. The lane-change warning system warns the driver about the obstacle in accordance with a result of the detection of the obstacle detection device. In the lane-change warning system, an obstacle, which is located in the lateral and rearward areas of the vehicle in the next lane on which the driver is driving, is detected. When a distance between the vehicle and the laterally rearward obstacle is a predetermined distance or longer and when a relative speed therebetween is higher than a predetermined speed, the lane-change warning system controls the turn signal operating lever to be returned to a neutral position right after the driver moves the turn signal operating lever. Meanwhile, when a relative distance between the vehicle and the laterally rearward obstacle is shorter than the predetermined distance, the lane-change warning system controls the turn signal operating lever not to be easily moved without a predetermined degree of force. With the technique described in Patent document 1, since a warning about a risk of the obstacle approaching the vehicle is issued by means of the turn signal operating lever, the driver may easily recognize the warning. Moreover, the driver is less likely to feel confused, compared to a case where the driver is warned about a risk of an obstacle approaching the vehicle by means of a sound. In addition, the driver is prevented from not recognizing the warning. Accordingly, the risk is surely notified to the driver.

Further, a known turn signal sound generating system for a vehicle, which generates different turn signal sounds in accordance with an operating condition of a turn signal of the vehicle and in accordance with a speed of the vehicle, is disclosed in JP2000-272414A (hereinafter referred to as Patent document 2). In a condition where the turn signal is in operation and in a condition where the speed of the vehicle is higher than a predetermined speed, changing lanes is determined to be dangerous based on information from side and rear monitors, which monitor other vehicles moving from lateral and rearward directions of the vehicle. At this time, the turn signal sound generating system operates a turn signal generator to emit a warning sound. With such technique, a speed of the vehicle at which a turn signal sound switches is linked to a speed of the vehicle at which the side and rear monitors start operating. Accordingly, a driver of the vehicle may recognize whether or not the side and rear monitors are in operation, by hearing and distinguishing different turn signal sounds. Consequently, the driver surely focuses on a warning sound indicating a risk of other vehicles approaching the vehicle of the driver when he/she changes lanes.

Furthermore, a side-rear monitoring system for a vehicle, disclosed in JP3464368B2 (hereinafter referred to as Patent document 3) detects another vehicle approaching from a rearward direction of the vehicle of a driver or from the next lane of a lane on which the driver is driving, on the basis of an image of a scene located in lateral and rearward areas of the vehicle of the driver. The side-rear monitoring system detects another vehicle approaching the vehicle of the driver by means of an image signal obtained by an imaging device, thereby determining a risk level of the approach of another vehicle and a direction in which the risk level is high, depending on how close the two vehicles are located to each other. The side-rear monitoring system includes a first warning indicator arranged near a right side mirror, a second warning indicator arranged near a left side mirror, and a third warning indicator arranged near a rear view mirror. When a risk of the approach of another vehicle from the right adjoining lane to the driving lane on which the vehicle of the drive is moving is high, a warning about the risk is indicated by the first warning indicator. When a risk of approach of another vehicle from the left adjoining lane to the driving lane is high, a warning about the risk is indicated by the second warning indicator. When a warning about another vehicle approaching the vehicle of the driver from the rearward direction is high, a warning about the risk is indicated by the third warning indicator. According to the technique described in Patent document 3, the warning about the approach of another vehicle is issued to the driver with one of the related warning indicators corresponding to the direction in which the risk exists. Accordingly, the driver easily recognizes the direction in which the risk exists. Moreover, when the driver looks at one of the related warning indicators, he/she instinctively looks at the side mirror. Thus, the side-rear monitoring system enables the driver to instinctively focus on another vehicle approaching his/her vehicle.

A turn signal serves to notify an intention of a driver to turn right or left or to change lanes to other drivers driving around a vehicle of the driver. For example, it is appropriate for the driver to change lanes after confirming that no vehicle is approaching from lateral and rearward directions of his/her vehicle, operating a turn signal operating lever, and notifying his/her intention to change lanes to the drivers around him/her. Thus, the driver's intention to change lanes is generally determined by the operation of the turn signal operating lever.

According to the techniques of Patent document 1 and Patent document 2, a warning about an existence of an obstacle around the vehicle is issued after the driver operates the turn signal operating lever, i.e., the driver in a condition where his/her intention to change lanes is fixed and he/she is ready to change lanes. Accordingly, even though the warning is issued, the driver may not prevent a collision between the vehicle and the obstacle. Consequently, the warning should be issued not after the driver operates the turn signal operating lever and his/her intention to change lanes is fixed but before the driver operates the turn signal operating lever with a decision to change lanes.

In addition, according to the techniques described in Patent documents 1 to 3, the warning may be issued even when the driver does not need the warning. In particular, according to the technique of Patent document 3, the side-rear monitoring system issues the warning even when the driver is in a normal driving condition without having his/her intention to change lanes, therefore issuing an ambiguous or confusing warning to the driver. Although a switch for indicating and not indicating the warning may be optionally applied to the side-rear monitoring system, turning the switch on/off when needed is troublesome for the driver. Such changing operation of the switch is not appropriate for the driver to drive safely.

A need thus exists for a vehicle surrounding recognition support system for a vehicle, which is not susceptible to the drawbacks mentioned above.

SUMMARY OF THE INVENTION

According to an aspect of the present invention, a vehicle surrounding recognition support system for a vehicle includes a contact detection device detecting whether or not a driver of the vehicle touches a turn signal operating lever or moves his/her hand close to the turn signal operating lever, an object position detecting device detecting a position of an object existing around the vehicle, an object information identification device identifying information relating to the object in accordance with a result of detection of the object position detecting device, and a warning device warning the driver about the existence of the object in accordance with the information of the object, identified by the object information identification device, when the contact detection device detects that the driver touches the turn signal operating lever or moves his/her hand close to the turn signal operating lever.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Embodiments of the present invention will be explained with reference to the illustrations of the figures as follows.

Examples of a vehicle to which a vehicle surrounding recognition support system for a vehicle is applied are shown in the figures.

(Overall View)

Figure 1:
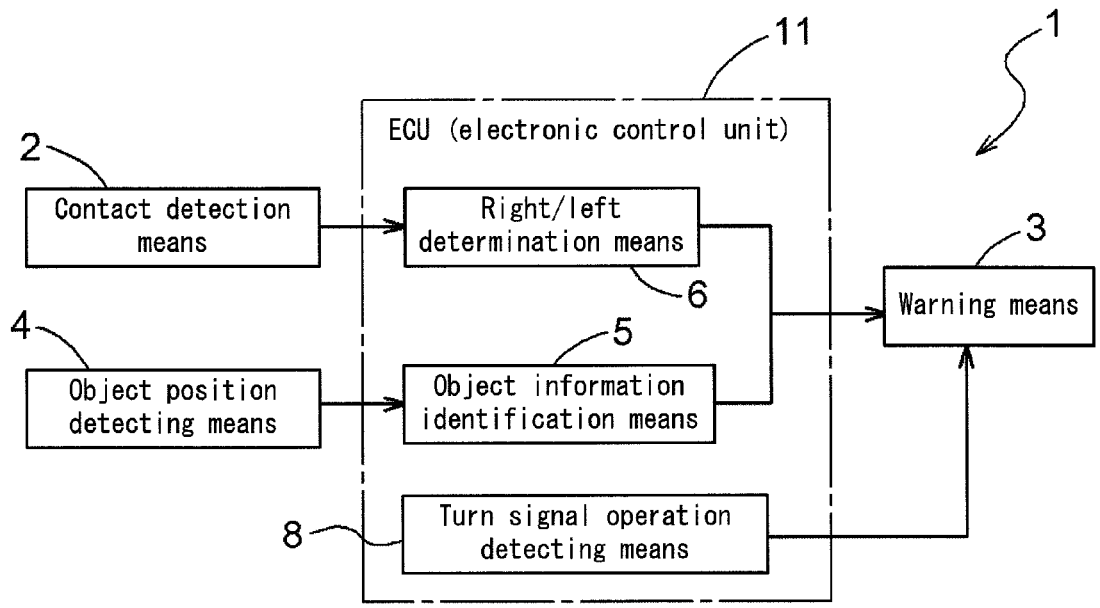
FIG. 1 is block diagram illustrating a vehicle surrounding recognition support system for a vehicle of a first embodiment according to the present invention.

FIG. 1 is a block diagram illustrating a configuration of a vehicle surrounding recognition support system 1 for a vehicle. The vehicle surrounding recognition support system 1 includes a contact detection means (contact detection device) 2, a right/left determination means (right/left determination device) 6, an object position detecting means (object position detecting device) 4, an object information identification means (object information identification device) 5, a warning means (warning device) 3, and a turn signal operation detecting means (turn signal operation detecting device) 8.

(Contact Detection Means)

Figure 2:
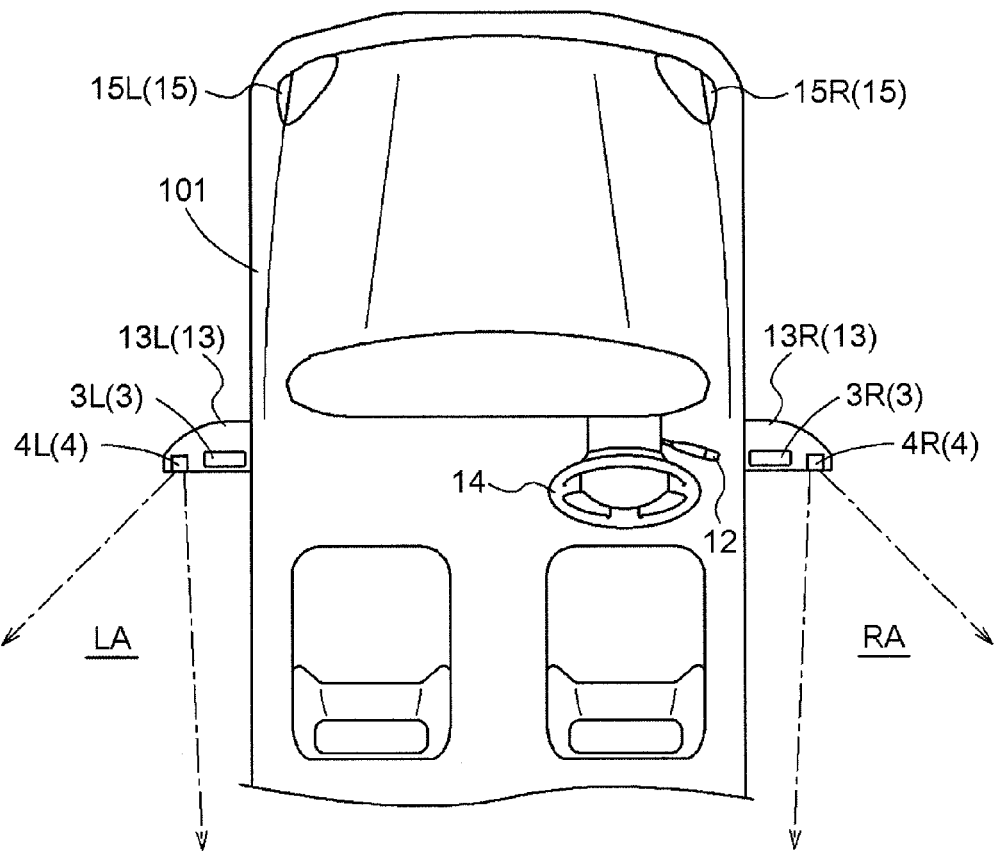
FIG. 2 is a plan view of the vehicle to which the vehicle surrounding recognition support system of the first embodiment according to the present invention is applied.
Figure 3A:
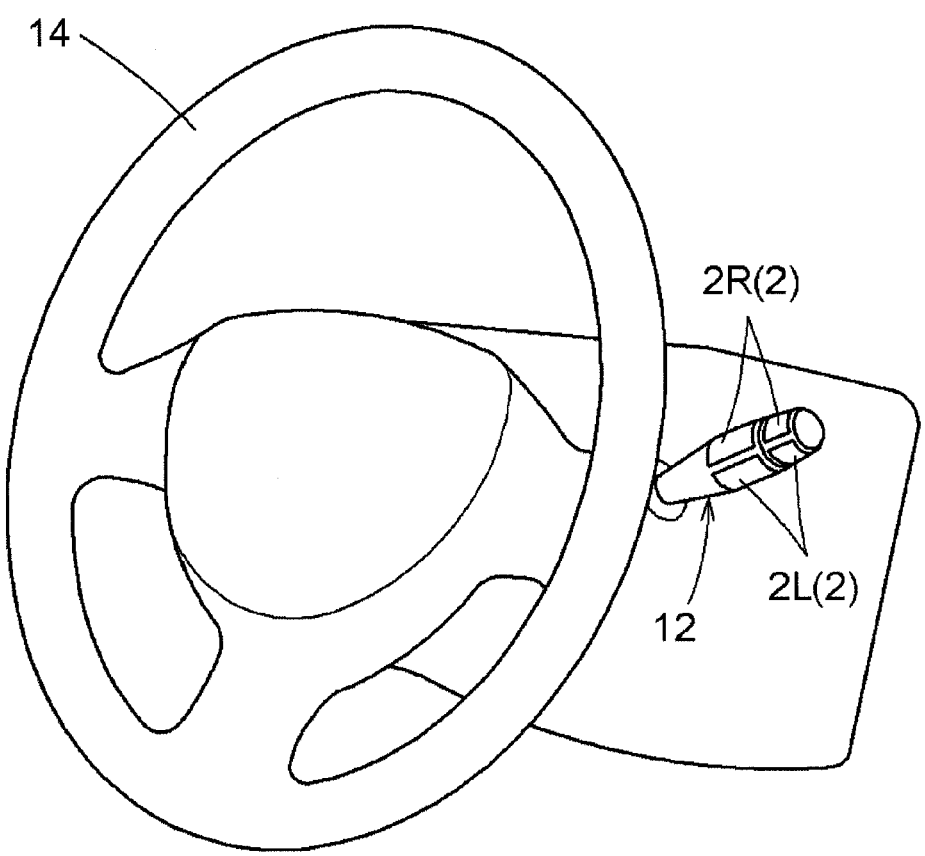
FIG. 3A is a perspective view of a turn signal operating lever.
Figure 3B:
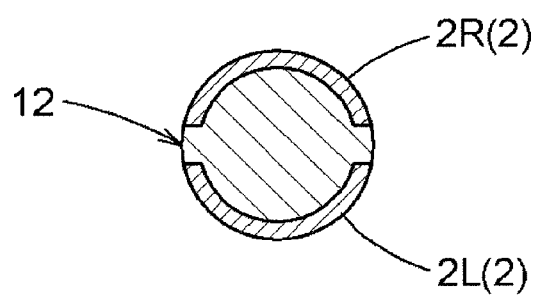
FIG. 3B is a cross-sectional view of the turn signal operating lever.

As shown in FIG. 3, the contact detection means 2 are arranged at a turn signal operating lever 12. For example, the contact detection means 2 include capacitance sensors 2 detecting variations in capacitance. The turn signal operating lever 12 is arranged at the right side relative to a steering handle 14. When the turn signal operating lever 12 is operated upward, a left turn signal light 15L located at the left side in FIG. 2 blinks. When the turn signal operating lever 12 is operated downward, a right turn signal light 15R located at the right side in FIG. 2 blinks. As shown in FIG. 3B, a right capacitance sensor 2R is arranged at an approximately upper portion of the turn signal operating lever 12 and a left capacitance sensor 2L is arranged at an approximately lower portion of the turn signal operating lever 12. The left capacitance sensor 2L detects a contact between the driver's hand and the lower portion of the turn signal operating lever 12 in response to variations in capacitance when a driver touches the lower portion of the turn signal operating lever 12 in order to activate the left turn signal light 15L. The right capacitance sensor 2R detects a contact between the driver's hand and the upper portion of the turn signal operating lever 12 in response to variations in capacitance when the driver touches the upper portion of the turn signal operating lever 12 in order to activate the right turn signal light 15R.

(Right/Left Determination Means)

The right/left determination means 6 is provided in an ECU (electronic control unit) 11. The right capacitance sensor 2R and the left capacitance sensor 2L are connected to the ECU 11. The right/left determination means 6 determines which of the right turn signal light 15R and the left turn signal light 15L is activated by an action the driver touches the turn signal operating lever 12. Hereinafter, the action the driver operates the turn signal operating lever 12 in order to activate either the right turn signal light 15R or the left turn signal light 15L in cases of changing lanes is referred to as "a turn signal operation".

Since the vehicle surrounding recognition support system 1 includes the right/left determination means 6 provided in the ECU 11, the warning means 3 may issue a warning so as to alert the driver to a direction only for which the driver is about to conduct a turn signal operation, i.e., a direction only required to be perceived by the driver. Accordingly, an unnecessary warning about an object around the vehicle is prevented from being issued to the driver. Consequently, a more practical vehicle surrounding recognition support system 1 for a vehicle may be configured.

(Object Position Detecting Means)

As shown in FIG. 2, the object position detecting means 4 includes distance detection sensors attached to side mirrors 13. For example, each of the distance detection sensors is configured by an ultrasonic sensor 4. A right ultrasonic sensor 4R is attached to a right side mirror 13R so as to detect a relative position between an object existing in a right area laterally rearward of a vehicle 101 and the right ultrasonic sensor 4R in each time series. A left ultrasonic sensor 4L is attached to a left side mirror 13L so as to detect a relative position between an object existing in a left area laterally rearward of the vehicle 101 and the left ultrasonic sensor 4L in each time series.

A mechanism of detection for a relative position between an object and the vehicle 101 will be briefly described as follows. After each of the ultrasonic sensors (each serving as the object position detecting means) 4 emits an ultrasonic wave, the ultrasonic wave hits against the object, so that a reflected wave occurs. Afterwards, the ultrasonic sensor 4 receives the reflected wave. The object position detecting means 4 computes a relative position between the object and the vehicle 101 in each time series in accordance with a period from the time the ultrasonic sensor 4 emits the ultrasonic wave to the time the ultrasonic sensor 4 receives the reflected wave.

A right detection area RA as a detection area of the right ultrasonic sensor 4R and a left detection area LA as a detection area of the left ultrasonic sensor 4L are preset. Accordingly, an object, which is located away from the vehicle 101 and less likely to collide against the vehicle 101, may be excluded from a target object to be detected by the ultrasonic sensor 4. In addition, a detection distance may be set to be short by setting a short standby time from the time the ultrasonic sensor 4 emits an ultrasonic wave to the time the ultrasonic sensor 4 receives a reflected wave. An angle of a detection area is set at an angle enabling the ultrasonic sensor 4 to detect the laterally rearward area of the vehicle 101. The angle of the detection area is set in such a way that the ultrasonic sensor 4 may detect at least a blind spot of the vehicle 101. The angle of the detection area is set at approximately 40 degrees to 45 degrees in the first embodiment.

(Object Information Identification Means)

The object information identification means 5 is arranged in the ECU (electronic control unit) 11. Information of an object existing around the vehicle 101 is identified by the object information identification means 5 in accordance with a result of detection of the right ultrasonic sensor 4R or the left ultra sonic sensor 4L. The information of the object includes a relative distance, a relative moving direction, and a relative speed between the object and the vehicle 101.

The object information identification means 5 computes a relative distance, a relative moving direction, and a relative speed between an object existing around the vehicle 101 and the vehicle 101 on the basis of a relative position between the object and the vehicle 101 in each time series, which is detected by the ultrasonic sensor 4. At least the existence of the object within the detection area of the ultrasonic sensor 4 is identified by the object information identification means 5. Details of such computation will not be described below because the computation is commonly known.

(Warning Means)

Light emitting devices 3 each serving as the warning means 3 are attached to the side mirrors 13, for example, as shown in FIG. 2. A right light emitting device 3R is attached to the right side mirror 13R while a left light emitting device 3L is attached to the left side mirror 13L. A warning about an object existing around the vehicle 101 is issued to the driver by means of the light emitted from either one of the light emitting devices 3. Each of the light emitting devices 3 may blink in order to clearly warn the driver about the existence of the object. For example, an LED may be applied as an illuminant of the light emitting device 3. Since the LED presents advantages such as lower energy consumption, longer life time, and smaller size, the LED is an appropriate illuminant to be attached to each of the side mirrors 13. In this way, since the warning means 3 is the light emitting device 3 that visually warns the driver about the existence of the object, the driver may surely recognize the warning.

The side mirror 13 described in the first embodiment includes a mirror portion serving as a reflector and a supporting case supporting the mirror portion.

When the right/left determination means 6 determines that a contact is made between the right capacitance sensor 2R and the driver's hand and when an object exists in the right detection area RA of the right ultrasonic sensor 4R, the ECU 11 energizes the right light emitting device 3R. Afterwards, the right light emitting device 3R emits light, thereby alerting the driver that the object exists in the right laterally rearward area of the vehicle 101. Meanwhile, when the right/left determination means 6 determines that a contact is made between the left capacitance sensor 2L and the driver's hand and when an object exists in the left detection area LA of the left ultrasonic sensor 4L, the ECU 11 energizes the left light emitting device 3L. Afterwards, the left light emitting device 3L emits light, thereby alerting the driver that the object exists in the left laterally rearward area of the vehicle 101.

Since the light emitting devices 3 are arranged at the side mirrors 13, the driver is naturally encouraged to visually check a blind spot laterally rearward of the vehicle 101 so as to confirm whether or not an object exists in a direction corresponding to a turn signal operation to be intended by the driver when he/she looks at either one of the side mirrors 13. Accordingly, a more safe driving environment may be provided to the driver. Further, the driver daily uses the vehicle surrounding recognition support system 1, thereby habitually looking at the relevant side mirrors 13 to visually check a surrounding area of the vehicle 101 before conducting the turn signal operation. Consequently, the driver habituates himself/herself to a safe driving.

It is appropriate that the light emitted from the light emitting device 3 is seen only by the driver of the vehicle 101 and not seen from other objects existing around the vehicle 101, such as other drivers or pedestrians. A warning about an object around the vehicle 101, which is indicated by the light emitting device 3, is ambiguous to other drivers. Accordingly, the ambiguous warning may unnecessarily disturb other drivers. Thus, it is appropriate that measures for preventing the ambiguous warning are taken, for example, by making the light emitting devices 3 have directivity toward the driver of the vehicle 101 and by covering peripheral areas of the light emitting devices 3 for hiding the lights of the light emitting devices 3 so as not to be easily seen from other directions.

According the configuration of the vehicle surrounding recognition support system 1 of the first embodiment, an existence of an object may be notified to the driver before his/her intention to do a subsequent action during driving is determined by a turn signal operation conducted by the driver. When the existence of the object is notified to the driver, the driver recognizes the object and visually checks a surrounding area of the vehicle 101. Thus, the driver conducts the turn signal operation in no hurry after visually checking the safety around the vehicle 101. As a result, a safer driving environment may be provided to the driver.

Moreover, without depending on recognition of whether or not an object exists around the vehicle 101, the driver may perceive the surrounding circumstance only when he/she clearly shows his/her intention to perceive a surrounding circumstance around the vehicle 101 by touching the turn signal operating lever 12. Accordingly, the vehicle surrounding recognition support system 1 easily used by the driver while not disturbing a normal driving operation by the driver may be configured.

(Turn Signal Operation Detecting Means)

The turn signal operation detecting means 8 arranged in the ECU 11 as shown in FIG. 1 detects whether or not the turn signal operating lever 12 is operated by the driver. When the driver conducts a turn signal operation for activating the right turn signal light 15R, the ECU 11 controls energization to the right turn signal light 15R. The turn signal operation detecting means 8 is, for example, a mechanism to detect the energization. A mechanism to detect energization to a circuit is commonly known, therefore not being described here.

When a turn signal operation is conducted by the driver, a warning about an object existing around the vehicle 101, which is indicated by the light emitting device 3, is no longer necessary because the driver has already determined his/her intention to do a subsequent driving action. According to the configuration of the vehicle surrounding recognition support system 1 including the turn signal operation detecting means 8 as described in the first embodiment, when the turn signal operation detecting means 8 detects that the turn signal operating lever 12 is operated, the light emitting device 3 turns the light off. Accordingly, an unnecessary warning is prevented, so that a more practical vehicle surrounding recognition support system 1 may be configured.

(Operation of the Vehicle Surrounding Recognition Support System)

Figure 5:
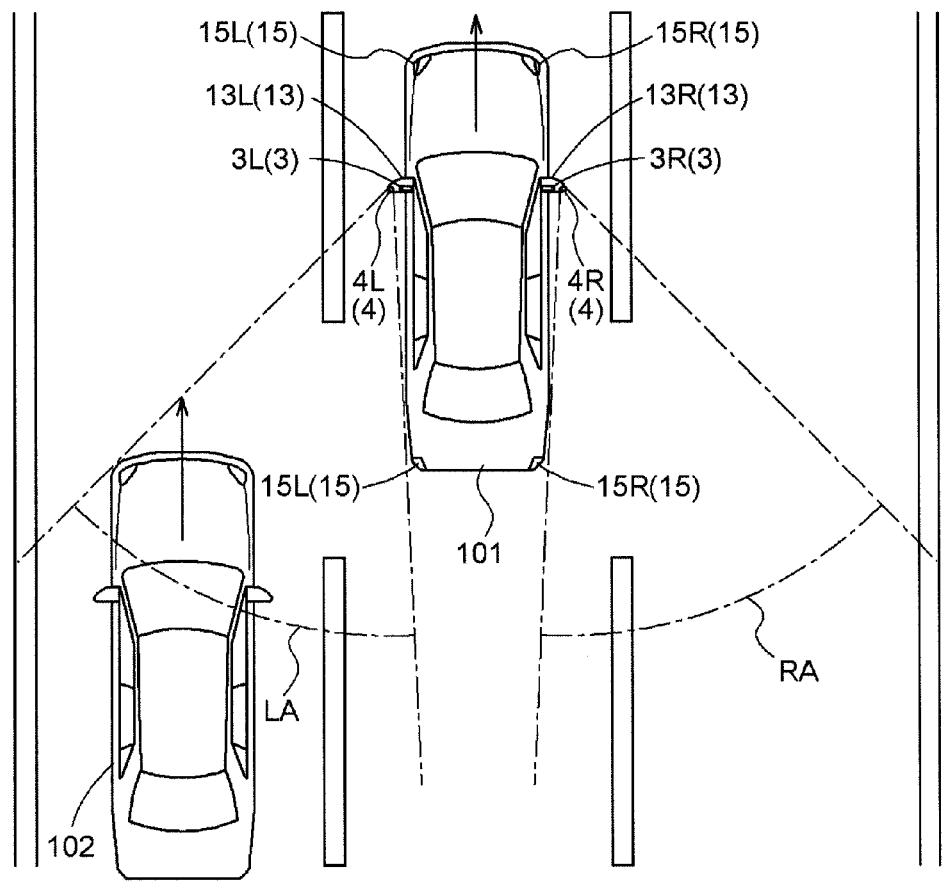
FIG. 5 is a diagram showing a condition where the vehicle including the vehicle surrounding recognition support system of the first embodiment according to the present invention detects another vehicle.

Operation of the vehicle surrounding recognition support system 1 will be described with reference to the figures as follows. FIG. 5 is a view showing a condition where the vehicle surrounding recognition support system 1 detects another vehicle 102. Prior to implementation of a turn signal operation before changing lanes, the driver activates the vehicle surrounding recognition support system 1 by touching the turn signal operating lever 12 in order to confirm whether or not an object such as the vehicle 102 exists around the vehicle 101 of the driver. When the vehicle 102 exists in a direction corresponding to a turn signal operation to be conducted by the driver, i.e., the vehicle 102 exists in the detection area of the ultrasonic sensor 4 located in the direction of a lane to which the driver is about to change from the current driving lane, the light emitting device 3 arranged at the side mirror 13 emits light. Accordingly, the existence of the vehicle 102 is notified to the driver.

In FIG. 5, the vehicle 102 exists in the left detection area LA. Accordingly, when the driver touches the turn signal operating lever 12 in order to change the current driving lane from the middle lane to the left lane, the left capacitance sensor 2L detects a contact between the driver's hand and the lower portion of the turn signal operating lever 12. As a result, the left light emitting device 3L emits light. At this time, the driver drifts his/her attention to the left side mirror 13L and looks thereat in order to confirm the light of the left light emitting device 3L. Consequently, the driver is naturally encouraged to confirm a left area laterally rearward of the vehicle 101, which is reflected in the left side mirror 13L. Further, while the left light emitting device 3L is emitting light, the driver is encouraged to focus on a left scene laterally rearward of the vehicle 101. Thus, the driver drifts his/her attention further to the left side mirror 13L and visually checks the left laterally rearward scene including a blind spot before operating a turn signal operation and determining his/her intention to do a subsequent driving operation, thereby confirming whether or not the vehicle 102 or the like exists around the vehicle 101.

In addition, the vehicle 102 does not exist in the right detection area RA as seen in FIG. 5. Accordingly, even when the driver attempts to change the current driving lane from the middle lane to the right lane and touches the upper portion (the right capacitance sensor 2R) of the turn signal operating lever 12, the right light emitting device 3R does not emit light. However, the driver at least confirms a right scene laterally rearward of the vehicle 101, which is reflected in the right side mirror 13R because he/she confirms whether or not the right light emitting device 3R emits a light. Consequently, the driver daily uses the vehicle surrounding recognition support system 1, thereby habitually looking at the side mirror 13 before conducting a turn signal operation.

Likewise, when the driver turns the vehicle 101 left at an intersection, the driver touches the turn signal operating lever 12. Accordingly, the capacitance sensor 2 detects a contact between the driver's hand and the lower portion of the turn signal operating lever 12. Consequently, prior to implementation of a turn signal operation, the driver may confirm whether or not a motorized two-wheeled vehicle, a bicycle, a pedestrian, or the like exists in the left laterally rearward area of the vehicle 101 according to the presence or absence of the light emitted from the light emitting device 3. Furthermore, the driver may be encouraged to confirm the rearward area of the vehicle 101 and to visually check the right laterally rearward area including a blind spot of the vehicle 101. Thus, the driver is encouraged to drive safely, thereby preventing an accident in which the vehicle 101 turning right or left hits or contacts a motorized two-wheeled vehicle or the like approaching the vehicle 101 from the right or left laterally rearward direction.

(Control Flow of the Vehicle Surrounding Recognition Support System)

A control flow of the vehicle surrounding recognition support system 1 will be described with reference to FIG. 4 as follows. When the driver touches the turn signal operating lever 12, either the right capacitance sensor 2R or the left capacitance sensor 2L detects a contact between the driver's hand and the turn signal operating lever 12 in response to variations in capacitance due to in S1 of FIG. 4. After either the right capacitance sensor 2R or the left capacitance sensor 2L detects the contact, the control flow moves to S2. As long variations in capacitance are detected by either the right capacitance sensor 2R or the left capacitance sensor 2L, each capacitance sensor 2 continues monitoring variations in capacitance.

Figure 4:
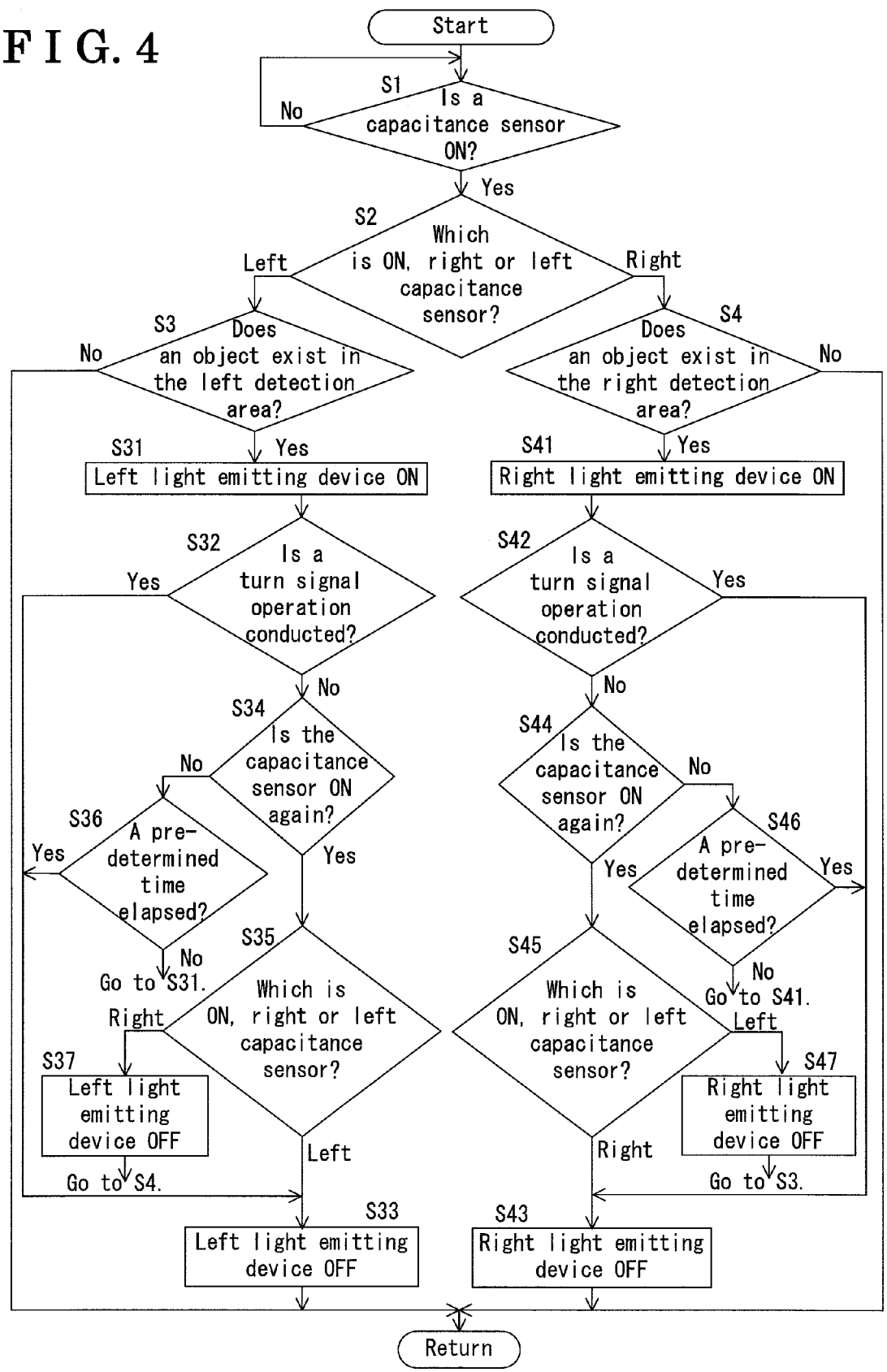
FIG. 4 is a flow chart showing a control flow of the vehicle surrounding recognition support system of the first embodiment according to the present invention.

In S2 of FIG. 4, the right/left determination means 6 determines which of the right capacitance sensor 2R and the left capacitance sensor 2L detects a contact between the driver's hand and the turn signal operating lever 12. When the right/left determination means 6 determines that the left capacitance sensor 2L detects a contact between the driver's hand and the lower portion of the turn signal operating lever 12, the control flow moves to S3. When the right/left determination means 6 determines that the right capacitance sensor 2R detects a contact between the driver's hand and the upper portion of the turn signal operating lever 12, the control flow moves to S4.

In S3 of FIG. 4, whether or not an obstacle such as the vehicle 102 exists in the left detection area LA is determined based on information of a relative distance or the like between the obstacle and the vehicle 101, which is identified by the object information identification means 5 from a result of detection of the left ultrasonic sensor 4L. When an object exists in the left detection area LA, the left light emitting device 3L emits light (S31). When an object does not exist in the left detection area LA, no further control proceeds and the control flow moves to Return.

After the left light emitting device 3L emits light, whether or not a turn signal operation is conducted is monitored by the turn signal operation detecting means 8 (S32). When a turn signal operation is detected by the turn signal operation detecting means 8, the left light emitting device 3L turns the light off (S33) and the control flow moves to Return. The turn signal operation may relate to an operation of the turn signal operating lever 12 for activating either the right turn signal light 15R or the left turn signal light 15L. Even when the turn signal operation does not relate to the operation of the turn signal operating lever 12 for activating the left turn signal light 15L but to the operation of the turn signal operating lever 12 for activating the right turn signal light 15R, the left light emitting device 3L turns the light off because at least the driver clearly decides his/her intention to do a subsequent driving operation and the vehicle surrounding recognition support system 1 completes the role at this time.

In S32 of FIG. 4, when a turn signal operation is not conducted, the control flow moves to S34. Which of these the right capacitance sensor 2R and the left capacitance sensor 2L detects a contact between the driver's hand and the turn signal operating lever 12, is monitored in S34. When either the right capacitance sensor 2R or the left capacitor sensor 2L detects a contact between the driver's hand and the turn signal operating lever 12, the control flow moves to S35. In S35, the right/left determination means 6 determines which of the right capacitance sensor 2R and the left capacitance sensor 2L detects the contact.

In S35 of FIG. 4, when the right/left determination means 6 determines that the left capacitance sensor 2L detects a contact between the driver's hand and the lower portion (the left capacitance sensor 2L) of the turn signal operating lever 12, the left light emitting device 3L turns the light off (S33) and the control flow moves to Return. Such control is effective for a case where the driver withdraws his/her decision for a subsequent driving operation without executing a turn signal operation. The control is sort of a manual cancel operation.

When the right/left determination means 6 determines in S35 that the right capacitance sensor 2R detects a contact between the driver's hand and the upper portion (the right capacitance sensor 2R) of the turn signal operating lever 12, the left light emitting device 3L turns the light off in S37 and the control flow moves to S4. For example, as shown in FIG. 5, while driving the vehicle 101 in the middle lane of a three-lane section, the driver attempts to change the current driving lane from the middle lane to the left lane. At this time, the driver confirms the vehicle 102 moving in the left laterally rearward area of the vehicle 101 by using the vehicle surrounding recognition support system 1. Afterwards, the driver withdraws his/her decision to change the current driving lane from the middle lane to the left lane and decides to change the current driving lane from the middle lane to the right lane. Thus, shifting from the control flow for confirming the left laterally rearward area to the control flow for confirming the right laterally rearward area is easily proceeded. As a result, a more practical recognition support system 1 may be configured.

In S34, when no variation of capacitance is detected by the capacitance sensor 2, the control flow moves to S36. Whether or not a predetermine time elapses after the left light emitting device 3L emits light in S31 is determined in S36. When a turn signal operation is not conducted even after the predetermined time elapses, it is assumed that the driver withdraws his/her decision for a subsequent driving operation. Accordingly, after the predetermined time elapses, the control flow moves to S33. In S33, the left light emitting device 3L turns the light off and the control flow moves to Return. Such control is sort of an automatic cancel operation.

For example, it is appropriate for the predetermined time to be set to be approximately five seconds. When the light emitting device 3 emits light for five seconds, the driver may surely confirm the presence or absence of the light emitted of the light emitting device 3. Moreover, when the driver inadvertently touches the turn signal operating lever 12, the left light emitting device 3L also emits light. Accordingly, such control that the light emitting device 3 turns off the light after the predetermined time elapses from the start of the emitting of the light emitting device 3, is effective as an automatic cancel control.

When the right capacitance sensor 2R detects a contact between the driver's hand and the right capacitance sensor 2R in S2 of FIG. 4, the control flow moves to S4. At this time, a control, which is a symmetrical pattern from the above control for confirming the left laterally rearward area, is performed. The controls from S31 to S37 correspond to S41 to S47. "The left capacitance sensor 2L", "the left light emitting device 3L", "the left ultrasonic sensor 4L", "the left detection area LA", and "S3" are respectively replaced by "the right capacitance sensor 2R", "the right light emitting device 3R", "the right ultrasonic sensor 4R", "the right detection area RA", and "S4" in the control for confirming the right laterally rearward area.

The capacity of detection of the capacitance sensor 2 may be adjusted so as to respond to variations in capacitance only when the driver moves his/her hand close to the turn signal operating lever 12. Such action of moving the driver's hand close to the turn signal operating lever 12 signifies his/her intention to activate either one of the right turn signal 15R and the left turn signal 15L.

A contact point sensor responding to pressure exercised by the driver's hand may be applied as a contact detection means. In addition, the contact point sensor may be arranged at the root portion of the turn signal operating lever 12. In this case, the contact point sensor is arranged so as to detect a slight moving distance of the turn signal operating lever 12, which is shorter than a moving distance of the turn signal operating lever 12, required for activating either the right turn signal light 15R or the left turn signal light 15L. Vibrations of a vehicle are required to be taken into consideration so that the contact point sensor may not respond to such vibrations.

As shown in FIG. 3, a headlight switch and other switches are arranged at an end portion of the free end of the turn signal operating lever 12. Accordingly, when the driver operates each switch, the capacitance sensor 2 may also respond to variations in capacitance. Consequently, an unnecessary warning about an object around the vehicle 101 may be issued to the driver. However, as described above, in the case where no turn signal operation is conducted for the predetermined time in S36 and S46, the light emitting device 3 turns the light off after the predetermined time elapses. Accordingly, no problem occurs in the use of the vehicle surrounding recognition support system 1. Likewise, no problem occurs in the use of the vehicle surrounding recognition support system 1 due to other functions being operated when the driver touches the turn signal operating lever 12. Appropriately, a step for conducting an automatic cancel operation when each switch is operated may be added.

Sensors other than the ultrasonic sensors 4 may be applied each as the object position detecting means 4. For example, when a clearance sonar system for a parking assist system is arranged at the vehicle 101, the clearance sonar system may be utilized as the object position detecting means 4. In this case, it is noted that the clearance sonar system requires a certain detection angle. A plurality of point sensors each serving as the object position detecting means 4 may be arranged at the vehicle 101. In the same way as the above-described first embodiment, the point sensors may compute a relative distance or the like between an object existing around the vehicle 101 and the vehicle 101 in each time series. Furthermore, laser radars used for a driving support may be applied each as the object position detecting means 4.

In the first embodiment, an example where the light emitting devices 3 are arranged in the side mirrors 13 is described. Light emitting devices may be arranged at areas near the side mirrors 13, for example, at front pillars. In this case, when a driver looks at each of the front pillars to confirm whether or not an object exists around his/her vehicle in a direction corresponding to a turn signal operation to be conducted by the driver, the side mirror 13 corresponding to the direction also comes into sight. Moreover, the driver is naturally encouraged to visually check a blind spot located in an area laterally rearward of his/her vehicle. Thus, a safer driving environment is provided to the driver.

In the first embodiment, the vehicle surrounding recognition support system 1 is configured so that the light emitting device 3 turns the light off to stop warning the driver when the turn signal operation detecting means 8 detects a turn signal operation. Alternatively, the vehicle surrounding recognition support system 1 may be configured so that the warning ends, for example, when a few seconds elapse after the turn signal operation detecting means 8 detects a turn signal operation. According to such configuration, a time allowance is provided to the driver until the warning ends after the driver completes the turn signal operation. Accordingly, in the case where the driver conducts a turn signal operation without confirming the warning, the driver has the time allowance until the warning ends. Consequently, the driver may confirm the warning for a certain period of time even after the turn signal operation is completed.

In addition, the turn signal operation detecting means 8 is not limited to the configuration described in the aforementioned first embodiment. For example, the turn signal operation detecting means 8 may be configured so as to detect whether or not a turn signal operation is conducted, in accordance with a result of detection of a detection means detecting a position of a turn signal operating lever. Even when the turn signal operating lever is not moved to a position for activating either a right or left turn signal light, whether or not a driver operates the turn signal operating lever in order to activate the right or left turn signal light may be determined by monitoring the position of the turn signal operating lever. Moreover, in cases where a turn signal operating lever is configured so as not to be easily moved without a predetermined degree of force in order to prevent an accidental operation of the turn signal operating lever, the turn signal operating lever may be in a sagged condition and not in an operable condition even when a driver applies a force in order to operate the turn signal operating lever. However, even when the applied force is not equal to a normal touch force, the turn signal operation detecting means may be configured so as to determine that a turn signal operation is conducted. In such case, a sensor detecting an area touched by the driver or pressure applied by the driver when he/she touches the turn signal operating lever may be utilized as the turn signal operation detecting means. Such sensor may function as both a contact detection means and a turn signal operation detecting means.

(Second Embodiment)

A second embodiment of a vehicle surrounding recognition support system 1 for a vehicle will be described with reference to the figures as follows. Explanations of the same configurations as those of the first embodiment are omitted and the same numbers are assigned to portions having the same configurations as those of the first embodiment.

Figure 6:
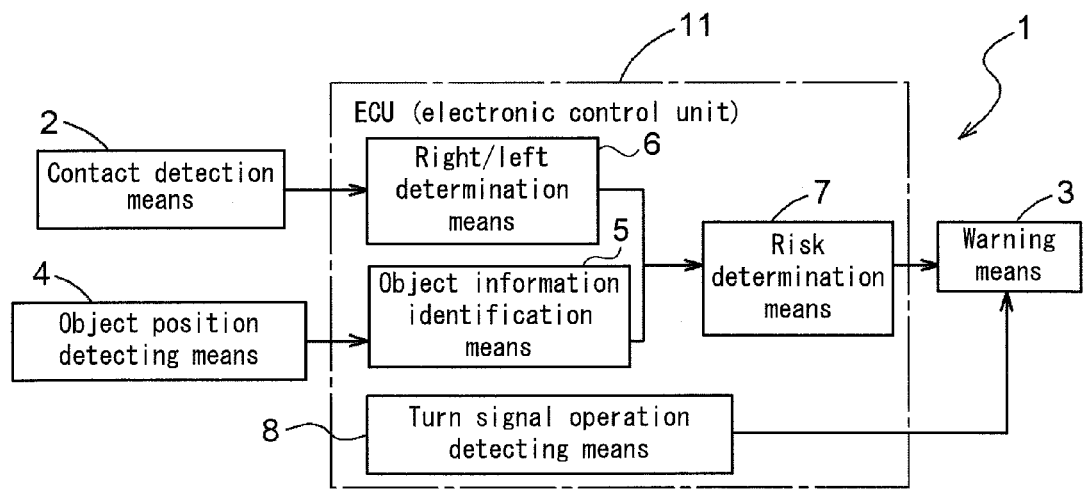
FIG. 6 is a block diagram illustrating a vehicle surrounding recognition support system for a vehicle of a second embodiment according to the present invention.

As shown in FIG. 6, the vehicle surrounding recognition support system 1 according to the second embodiment is configured by adding a risk determination means (risk determination device) 7 to the vehicle surrounding recognition support system 1 of the first embodiment.

(Risk Determination Means)

The risk determination means 7 is included in the ECU 11. A risk of a collision between the vehicle 101 and an object existing around the vehicle 101 is determined based on a result of determination of the right/left determination means 6 and information identified by the object information identification means 5. As described above, the object information identification means 5 identifies a relative distance, a relative moving direction, and a relative speed between the vehicle 101 and the object.

For example, under the condition where a relative speed between the vehicle 101 and the another vehicle 102 is a minus speed when the driver of the vehicle 101 changes lanes as shown in FIG. 5, it may be determined that the vehicle 102 is departing from the vehicle 101 even when the vehicle 102 exists in the detection area of the ultrasonic sensor 4. That is, even when the driver of the vehicle 101 changes from the current driving lane to the lane in which the vehicle 102 is moving, a risk of a collision between the vehicle 101 and the vehicle 102 is low. In addition, when a moving direction of the vehicle 102 relative to the vehicle 101 departs from the vehicle 101, a risk of a collision between the vehicle 101 and the vehicle 102 is low.

Thus, the vehicle surrounding recognition support system 1 determines a risk of a collision between the vehicle 101 and an object existing around the vehicle 101 by means of the risk determination means 7. When the risk is low, that is, when the need of alerting the driver to the risk is low, the vehicle surrounding recognition support system 1 is configured so as not to issue such warning to the driver. Accordingly, an unnecessary warning is prevented and reliability and practical utility of the vehicle surrounding recognition support system 1 may increase.

Figure 8:
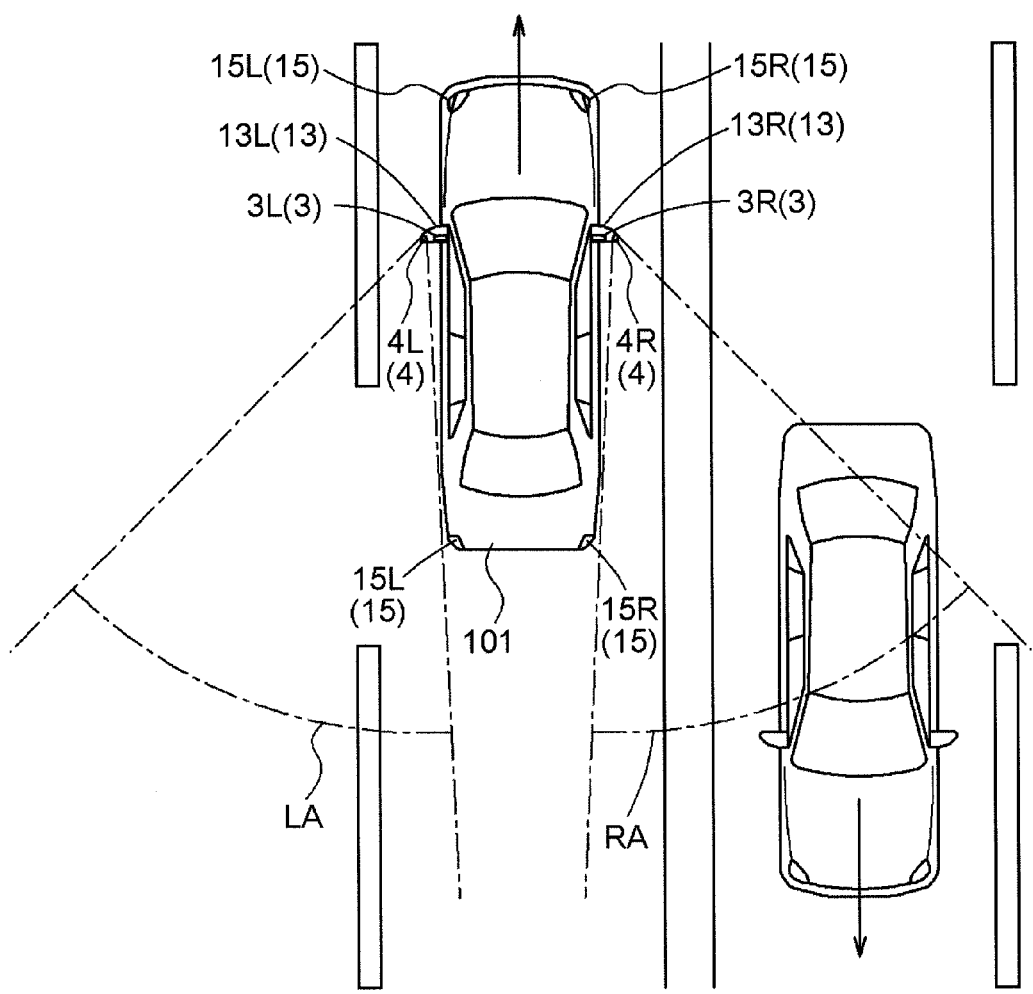
FIG. 8 is a view showing a condition where the vehicle according to the second embodiment of the present invention detects another vehicle.

FIG. 8 shows a condition where the vehicle 101 in which the vehicle surrounding recognition support system 1 of the second embodiment is mounted detects the vehicle 102 when the driver attempts to change the current driving lane from the middle lane to the right lane. When the driver changes the current driving lane from the middle lane to the right lane, a risk of the vehicle 101 hitting or contacting a motorized two-wheeled vehicle moving in the right laterally rearward area is low, compared to a case where the driver changes the current driving lane from the middle lane to the left lane. However, a motorized two-wheeled vehicle may dangerously approach the vehicle 101 so as to pass the right lateral side of the vehicle 101. Accordingly, the driver of the vehicle 101 touches the upper portion (the right capacity sensor 2R) of the turn signal operating lever 12 in order to confirm such another vehicle 102, thereby confirming whether or not an object exists in the right laterally rearward area of the vehicle 101.

At this time, when the vehicle surrounding recognition support system 1 is not equipped with the risk determination means 7, the vehicle 102 moving in the opposite lane is detected by the right ultrasonic sensor 3R and the right light emitting device 3R may emit light. When the vehicle surrounding recognition support system 1 is equipped with the risk determination means 7, the vehicle 102 departing from the vehicle 101 while moving in the opposite lane may be excluded from a detection target. Even when the aforementioned warning is issued under the condition where the vehicle surrounding recognition support system 1 is not equipped with the risk determination means 7, the driver may be encouraged to visually check a surrounding area of the vehicle 101. In this regard, the vehicle surrounding recognition support system 1 appropriately warns a driver about an existence of an object around his/her vehicle in order to improve the safety of driving.

The risk detection means 7 may be configured to sort risk levels and issue different warnings to a driver depending on the risk level. For example, in addition to the light emitting, a sound may be applied for warning the driver about an existence of an object around his/her vehicle. When a risk level is high, the sound enables the driver to pay more attention to a surrounding area of the vehicle.

Figure 7:
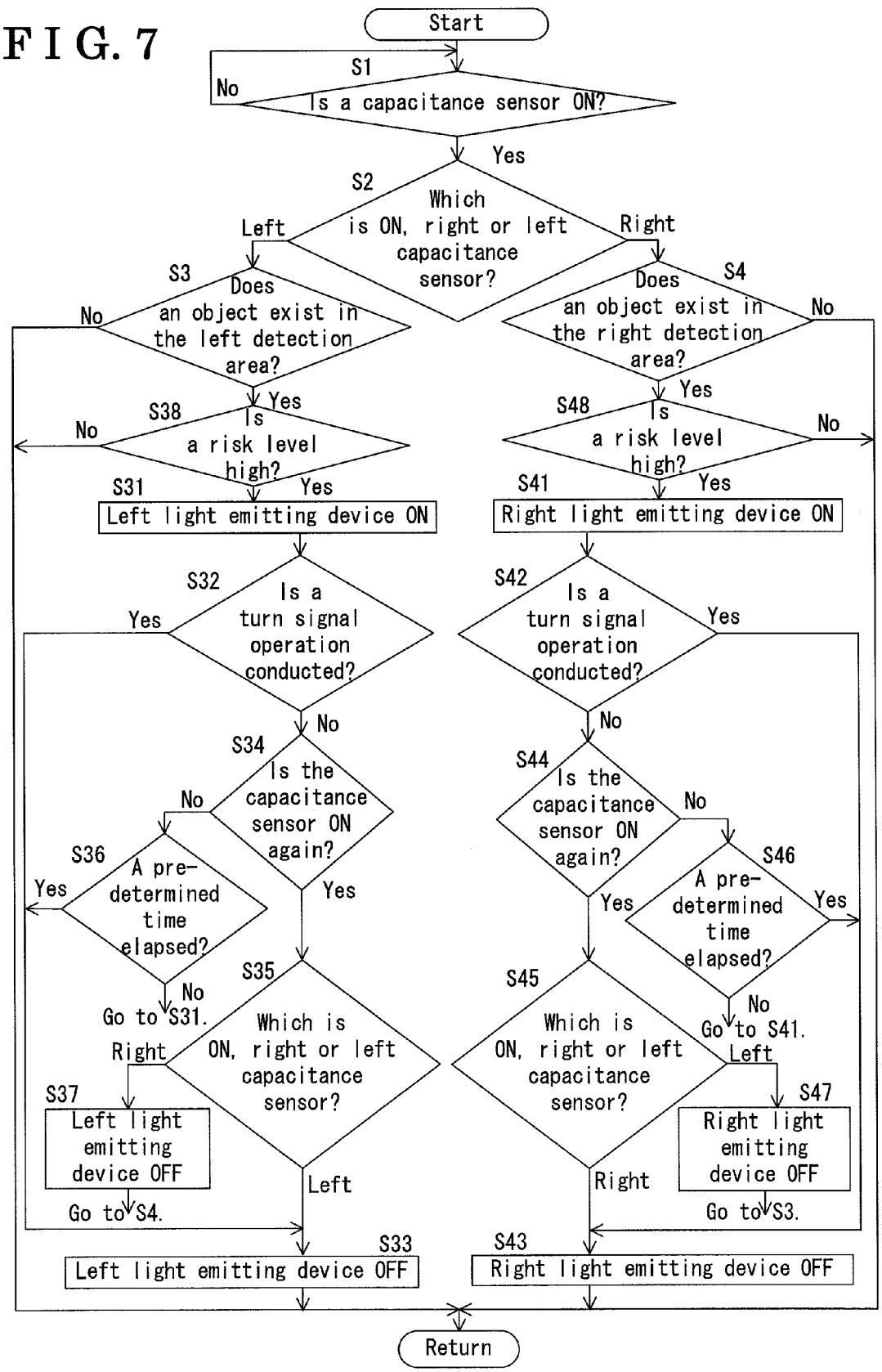
FIG. 7 is a flow chart showing a control flow of the vehicle surrounding recognition support system of the second embodiment according to the present invention.

FIG. 7 shows a control flow of the vehicle surrounding recognition support system 1 according to the second embodiment. When the existence of the vehicle 102 in the left detection area LA is determined by the left ultrasonic sensor 4L in S3, the control flow moves to S38. In S38, a risk of a collision between the vehicle 101 and the vehicle 102 is determined by the risk determination means 7. When the risk determination means 7 determines that the risk is high, the control flow moves to S31 and the left light emitting device 3L emits light. When the risk determination device 7 determines that the risk is low, no further control proceeds. Afterwards, the control flow moves to Return. Since a control flow following S4 for confirming the right laterally rearward area of the vehicle 101 is similar to the control flow for confirming the left laterally rearward area of the vehicle 101, explanations of the control flow of the right laterally rearward area are omitted.

(Third Embodiment)

Examples in which the warning means 3 includes the light emitting devices 3 are described in the aforementioned first and second embodiments. The vehicle surrounding recognition support system 1 of a third embodiment described below includes a sound emitting device serving as a warning means.

For example, a vehicle is mostly equipped with speakers. When the warning means serves as the sound emitting device, the speakers may be applied as the sound emitting devices, thereby warning a driver about an object around his/her vehicle. Moreover, the speakers are usually arranged in right and left doors of the vehicle. Accordingly, warnings for right and left directions of the vehicle may be differentiated.

The sound emitting device may be configured to include more speakers so that sounds having directivity are emitted from the additional speakers in addition to sounds emitted from the right and left speakers. According to such configuration, a warning sound emitted from each sound emitting device enables the driver to confirm which direction another vehicle is located seen from his/her vehicle. Approach or departure of another vehicle relative to or from the vehicle may be expressed by gradually increasing the volume of the warning sound or gradually decreasing the volume of the warning sound. Further, an actual moving state of another vehicle may be produced in an interior space of the vehicle in a simulated manner by means of stereophony. Moreover, high and low levels of a risk of a collision between the vehicle of the driver and another vehicle are sorted by the volume of the warning sound or tone differences between warning sounds.

When an obstacle exists around a vehicle, the warning means may be configured so as to emit noises near each side mirror in order for a driver to confirm an area laterally rearward of his/her vehicle by looking at the side mirror. Further, each warning means may be configured so as to emit a warning sound from an area near each side mirror and shift the warning sound to the laterally rearward direction of the vehicle, thereby encouraging the driver to visually check the laterally rearward area of the vehicle.

(Fourth Embodiment)

The examples in which the warning means 3 includes the light emitting devices 3 are described in the aforementioned first and second embodiments. The vehicle surrounding recognition support system 1 according to a fourth embodiment described below includes vibration generating devices each serving as a warning means. With the vibration generating devices according to the forth embodiment, a driver directly receives vibrations from each vibration generating device. Accordingly, a warning about an existence of an object around his/her vehicle is surely notified to the driver.

The vibration generating devices are vibration actuators and the like. The vibration actuators are arranged, for example, at right and left sides of a seating surface of a driver seat or areas near right and left grip portions of a steering wheel. As long as each of the vibration actuators may warn a driver about an object around his/her vehicle by generating vibrations, which is surely sensed by the driver, in such a way that the driver may at least recognize a direction in which the object exists, for example, a right or left side of the vehicle, the vibration actuator may be arranged at a different member. Risk levels are expressed by varying levels or rhythm patterns of the vibrations. In addition, approach or departure of another vehicle relative to or from the vehicle of the driver may be expressed by gradually increasing a vibration level or by gradually decreasing a vibration level.

Vibration sound effects may be produced by speakers in order to more clearly warn a driver about an object around his/her vehicle by means of the vibrations.

A specific interior trim member possibly vibrates in a vehicle while the vehicle is moving. The vibrations rarely transfer in normal conditions. Vibrations are unlikely to transfer between two different interior trim members under normal conditions. Such vibrations may promptly induce the driver's awareness of risk. Accordingly, even when a driver is unthinkingly driving his/her vehicle, the driver may pay more attention to a surrounding area of his/her vehicle. For example, two different members may be arranged on a seating portion of the aforementioned driver seat and on a back face of the driver seat. In addition, the different members may be arranged on surrounding areas of the right and left grip portions of the aforementioned steering wheel and on a front panel.

When an obstacle exists around a vehicle, a warning means may be configured so as to generate vibrations near each side mirror. With such configuration, a driver may be encouraged to visually check an area laterally rearward of his/her vehicle at least by looking at the side mirror. Further, the warning means may be configured to generate vibrations and transmit the generated vibrations from an area near the side mirror toward the lateral rearward direction of the vehicle, thereby encouraging the driver to visually confirm the laterally rearward area of the vehicle. In this case, the vibrations are not directly transmitted to a body of the driver. Consequently, it is necessary to generate large vibrations. For example, such large vibrations may be generated by reciprocating a striking member by means of a solenoid.

Fifth Embodiment

The examples in which the warning means 3 includes the light emitting devices 3 are described in the aforementioned first and second embodiments. However, in the vehicle surrounding recognition support system 1 according to a fifth embodiment described below, a warning about an object around a vehicle is issued by means of a display on a monitor mounted in a vehicle. With the display on the monitor, a driver confirms contents of the warning without shifting his/her gaze from a front area of the vehicle, so that the driver easily perceives the warning.

When a navigation system or a vehicle surrounding recognition support system for a vehicle for parking assistance is installed in a vehicle, a monitor displaying a warning about an object existing around the vehicle may be utilized as a warning means.

In the case where a driver touches a turn signal operating lever while attempting to change from the current driving lane to the left lane, it is appropriate that a warning message such as "Approaching an obstacle! Confirm your surroundings." or an icon enabling the driver to assume a direction in which a risk or an obstacle exists is displayed on the monitor. The driver may look at each side mirror and visually check an obstacle around his/her vehicle by selectively applying an image where another vehicle is reflected in the side mirror and an image where another vehicle is not reflected in the side mirror. As s result, the driver enables to visually check an obstacle around his/her vehicle by looking at the side mirror.

As described above, with the aforementioned configuration of the vehicle surrounding recognition support system 1, the driver is warned about an existence of an object located around his/her vehicle, for example, by touching the turn signal operating lever 12 before he/she decides his/her subsequent driving operation by conducting a turn signal operation. When the driver is warned, he/she recognizes the existence of the object around his/her vehicle and visually checks a surrounding area of the vehicle. In this way, the driver operates the turn signal operating lever 12 not in hurry after confirming the safety around the surrounding area of the vehicle. Thus, a safer driving environment is provided to the driver. In the aforementioned embodiments, a turn signal operation means a man-caused operation for activating a right/left turn signal light. In addition, without depending on recognition of whether or not an object exists round the vehicle, the driver is warned about the surrounding area of the vehicle only when he/she clearly shows his/he intention to perceive surrounding circumstances around the vehicle. Consequently, a more practical vehicle surrounding recognition support system 1 while not disturbing a normal driving operation by the driver is configured.

According to the aforementioned embodiments, the vehicle surrounding recognition support system 1 further includes the turn signal operation detecting means 8 detecting whether or not the driver operates the turn signal operating lever 12. With the vehicle surrounding recognition support system 1, the warning device 3 stops issuing the warning when the turn signal operation detecting means 8 detects that the driver operates the turn signal operating lever 12.

According to the aforementioned embodiments, the vehicle surrounding recognition support system 1 further includes the turn signal operation detecting means 8 detecting whether or not the driver operates the turn signal operating lever 12. With the vehicle surrounding recognition support system 1, the warning means 3 stops issuing the warning after the predetermined time elapses following the detection of the turn signal operation detecting means 8 for that the driver operates the turn signal operating lever 12.

Accordingly, when the driver operates the turn signal operating lever 12, the warning about the existence of the object around his/her vehicle is not necessary because he/she has already decided his/her subsequent driving operation such as changing lanes and turning right/left. With the configuration of the vehicle surrounding recognition support system 1, when the turn signal operation detection means 8 detects that the turn signal operating lever 12 is operated, the warning means 3 stops warning the driver. Accordingly, the driver is prevented from receiving an unnecessary warning. Consequently, a more practical vehicle surrounding recognition support system 1 is realized.

According to the aforementioned embodiments, the vehicle surrounding recognition support system 1 further includes the right/left determination means 6 determining which of the right turn signal light 15R and the left turn signal light 15L is activated by an action the driver touches the turn signal operating lever 12 or moves his/her hand close to the turn signal operating lever 12. With the vehicle surrounding recognition support system 1, the warning means 3 warns the driver about the existence of the object in accordance with a result of determination of the right/left determination means 6 and in accordance with the information of the object, identified by the object information identification means 5.

Accordingly, the warning means 3 issues a warning so as to alert the driver to a direction only for which the driver is about to activate the turn signal light, i.e., a direction only required to be perceived by the driver. Consequently, an unnecessary warning about an object around the vehicle is prevented from being issued to the driver. Thus, a more practical vehicle surrounding recognition support system 1 is realized.

According to the aforementioned embodiments, the contact detection means 2 is arranged at each of the upper and lower portions of the turn signal operating lever 12.

According to the aforementioned embodiments, the vehicle surrounding recognition support system 1 further includes the risk determination device 7 determining a risk of a collision between the vehicle and the object in accordance with the result of determination of the right/left determination means 6 and in accordance with the information of the object, identified by the object information identification means 5.

Accordingly, when a risk of a collision between the vehicle and an object located around the vehicle is low, i.e., when the need to a warning about the object relative to the driver is low, an unnecessary warning is prevented from being issued by the risk determination means 7. Consequently, the reliability and practical utility of the vehicle surrounding recognition support system 1 increases.

According to the aforementioned embodiments, the warning means 3 is the light emitting device 3.

According to the aforementioned embodiments, the light emitting device 3 is arranged at each side mirror 13.

According to the aforementioned embodiments, the light emitting device 3 is arranged at each of the right and left side mirrors 13R, 13L.

According to the aforementioned embodiments, the light emitting device 3 is arranged at the front pillar.

According to the aforementioned embodiments, light emitted from the light emitting device 3 is turned off after the predetermined time elapses.

Accordingly, the warning means 3 is the light emitting device 3 visually warning the driver about an existence of an object existing around his/her vehicle. Consequently, the driver easily recognizes the warning, so that the existence of the object is surely notified to the driver.

According to the aforementioned embodiments, the warning means 3 is the sound emitting device.

Accordingly, the sound generating device auditorily warns the driver an existence of an object around the vehicle. Consequently, the driver easily recognizes the warning, so that the existence of the object is surely notified to the driver.

According to the aforementioned embodiments, the warning means 3 is the vibration generating device.

Accordingly, the vibration generating device warns the driver an existence of an object in a tactile manner. Consequently, the driver easily recognizes the warning, so that the existence of the object is surely notified to the driver.

According to the aforementioned embodiments, the warning means 3 is the display on the monitor installed in the vehicle.

Accordingly, the driver confirms the contents of the warning without shifting his/her gaze from a front area of the vehicle, so that the warning is easily perceived by the driver.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle surrounding recognition support system for a vehicle, comprising:
    a contact detection device detecting whether or not a driver of the vehicle touches a turn signal operating lever or moves his/her hand close to the turn signal operating lever;
    an object position detecting device detecting a position of an object existing around the vehicle;
    an object information identification device identifying information relating to the object in accordance with a result of detection of the object position detecting device; and
    a warning device warning the driver about the existence of the object in accordance with the information of the object, identified by the object information identification device, when the contact detection device detects that the driver touches the turn signal operating lever or moves his/her hand close to the turn signal operating lever.

2. The vehicle surrounding recognition support system according to claim 1, further comprising a turn signal operation detecting device detecting whether or not the driver operates the turn signal operating lever, wherein the warning device stops issuing the warning when the turn signal operation detecting device detects that the driver operates the turn signal operating lever.

3. The vehicle surrounding recognition support system according to claim 1, further comprising a turn signal operation detecting device detecting whether or not the driver operates the turn signal operating lever, wherein the warning device stops issuing the warning after a predetermined time elapses following the detection of the turn signal operation detecting device for that the driver operates the turn signal operating lever.

4. The vehicle surrounding recognition support system according to claim 1, further comprising a right/left determination device determining which of the right turn signal light and the left turn signal light is activated by an action the driver touches the turn signal operating lever or moves his/her hand close to the turn signal operating lever, wherein the warning device warns the driver about the existence of the object in accordance with a result of determination of the right/left determination device and in accordance with the information of the object, identified by the object information identification device.

5. The vehicle surrounding recognition support system according to claim 4, wherein the contact detection device is arranged at each of upper and lower portions of the turn signal operating lever.

6. The vehicle surrounding recognition support system according to claim 4, further comprising a risk determination device determining a risk of a collision between the vehicle and the object in accordance with the result of determination of the right/left determination device and in accordance with the information of the object, identified by the object information identification device.

7. The vehicle surrounding recognition support system according to claim 1, wherein the warning device is a light emitting device.

8. The vehicle surrounding recognition support system according to claim 7, wherein the light emitting device is arranged at a side mirror.

9. The vehicle surrounding recognition support system according to claim 7, wherein the light emitting device is arranged at each of right and left side mirrors.

10. The vehicle surrounding recognition support system according to claim 7, wherein the light emitting device is arranged at a front pillar.

11. The vehicle surrounding recognition support system according to claim 7, wherein light emitted from the light emitting device is turned off after the predetermined time elapses.

12. The vehicle surrounding recognition support system according to claim 1, wherein the warning device is a sound emitting device.

13. The vehicle surrounding recognition support system according to claim 1, wherein the warning device is a vibration generating device.

14. The vehicle surrounding recognition support system according to claim 1, wherein the warning device is a display on a monitor installed in the vehicle.

* * * * *